United States Patent
Habisreitinger et al.

(10) Patent No.: US 7,488,437 B2
(45) Date of Patent: Feb. 10, 2009

(54) METHODS FOR ASSEMBLING PREPREG STACKS HAVING EXACT WEIGHT FOR PRODUCING SMC COMPONENTS

(75) Inventors: Uwe Habisreitinger, Lossburg (DE); Bernhard Nordmann, Böblingen (DE)

(73) Assignee: Daimler AG, Stuttgart (DE)

( * ) Notice: Subject to any disclaimer, the term of this patent is extended or adjusted under 35 U.S.C. 154(b) by 923 days.

(21) Appl. No.: 10/489,353

(22) PCT Filed: Aug. 14, 2002

(86) PCT No.: PCT/EP02/09095

§ 371 (c)(1), (2), (4) Date: Jul. 13, 2004

(87) PCT Pub. No.: WO03/024697

PCT Pub. Date: Mar. 27, 2003

(65) Prior Publication Data

US 2004/0231786 A1    Nov. 25, 2004

(30) Foreign Application Priority Data

Sep. 14, 2001  (DE) ................................ 101 45 308

(51) Int. Cl.
  *B29C 65/18* (2006.01)
(52) U.S. Cl. ............. 264/40.1; 264/40.4; 264/138; 264/152; 264/248; 264/325; 264/258

(58) Field of Classification Search ........................ None
See application file for complete search history.

(56) References Cited

U.S. PATENT DOCUMENTS

| | | | | |
|---|---|---|---|---|
| 4,026,749 A | * | 5/1977 | Appelhans et al. | 156/252 |
| 4,666,645 A | * | 5/1987 | Prewo et al. | 264/87 |
| 5,045,250 A | * | 9/1991 | Brussel | 264/40.4 |
| 5,425,834 A | * | 6/1995 | Shinohara et al. | 156/360 |
| 5,453,228 A | * | 9/1995 | Bellettato | 264/40.4 |
| 5,817,265 A | * | 10/1998 | Gendreau | 264/138 |

OTHER PUBLICATIONS

International Search Report, PCT/US02/09095, Oct. 31, 2002.

* cited by examiner

*Primary Examiner*—Edmund H. Lee
(74) *Attorney, Agent, or Firm*—Crowell & Moring LLP (57) ABSTRACT

A method for manufacturing SMC components from an appropriately adapted amount of a fibrous reactive synthetic resin which is provided in the form of defined blanks of prepregs. The prepregs are placed in a defined position into a heated mold of a molding press, the heated resin/fiber mass is flow-molded in the closing mold to form the SMC component, said component is thermally cured and subsequently removed from the mold. Two different approaches are taken, one being intended for introducing the resin mass into the mold as multiple layers and the other for introducing the resin mass as a single layer.

15 Claims, 4 Drawing Sheets

METHODS FOR ASSEMBLING PREPREG STACKS HAVING EXACT WEIGHT FOR PRODUCING SMC COMPONENTS

This application claims the priority of German Patent Document No. 101 45 308.6, filed 14 Sep. 2001 and PCT/EP02/09095 filed 14 Aug. 2002 the disclosure of which is expressly incorporated by reference herein, respectively.

FIELD OF THE INVENTION

The invention relates to a method for producing SMC components from fibrous, reactive prepregs.

BACKGROUND OF THE INVENTION

An article by R. Brüssel and U. Weber "SMC-Teile vollautomatisch herstellen" [Fully automatic production of SMC components], published in the journal Kunststoffe, year 79 (1989), pages 1149-1154—cited hereafter as [1] for short, describes a method for forming SMC components.

According to the literature reference [1], the production of SMC components starts with a specific amount of a mixture of reactive thermosetting synthetic resin and fibers that is adapted in its weight to be appropriate for the finished component. To be precise, the adapted amount of raw material is obtained by cutting out blanks of a specific size and shape from a prepreg web supplied in roll form and by laying the blanks together to form a prepreg stack. Such a prepreg stack is placed exactly in position in an opened mold of a press. The mold is heated to a temperature at which the reactive synthetic resin chemically reacts and sets. By initial slow closing of the mold located in the press, the raw material introduced is at first merely heated, whereby the synthetic resin becomes soft and free-flowing. Subsequently, the mold is closed with a controlled force and speed, the softened raw material flowing away to the sides and thereby completely filling the cavity of the mold. After this filling of the impression, the mold is kept closed for a time with a defined force, so that the synthetic resin can fully react and cure. Only then can the mold be opened and the finished SMC component be removed from it.

In the article [1] cited at the beginning, reference is made inter alia to a varying basis weight of the prepregs. In spite of all the efforts of the prepreg manufacturers, according to [1] even today it is still not possible for the prepreg webs to be manufactured with sufficient accuracy in the basis weight. Therefore, in preparation for each manufacturing step of an SMC component, it must be ensured that the mass of prepregs introduced into the mold is always the same, at least within a certain tolerance range. The higher the quality requirements imposed on the finished product, the less the resin mass introduced may vary about a desired value. In [1] it is mentioned that the problem of the varying basis weight of the prepreg web, and the consequent problem of exact feeding of the raw mass, could be overcome if the quality requirements imposed on the finished SMC molding could be reduced. If, however, the SMC components to be manufactured are thin-walled shell components with high quality requirements, the mass of the raw material to be introduced should wherever possible be fed in with a low range of upward and downward variation in comparison with a setpoint selection. If the amount of raw material introduced is too small, this causes the formation of surface roughnesses and also thin and weak points in the component, which in an extreme case could become perforated. If, on the other hand, too much raw material is fed into the mold, the wall thickness becomes too great, at least locally, which under some circumstances leads to warping of the component; in any event, components with excessive material are not dimensionally stable enough. Furthermore, in the case of overfeeding, material swells out along the parting line of the mold, which leads not only to excessive flash and corresponding extra work to remove the flash, but also to increased soiling of the mold and consequently an increase in the secondary work of "mold cleaning"; that is overfeeding leads overall to a reduction in productivity.

In the case of the automated method for manufacturing SMC components described in the literature reference [1], the blanks arranged in layers to form a prepreg stack as a raw mass are all rectangularly shaped and all have the same width in one direction, lying transversely to the prepreg web, that is the width of the prepreg web itself trimmed at the edges. The blanks are produced by cutting across the prepreg web, using a pneumatically driven high-speed cutter that is moved transversely over the prepreg web, which is supported at the location of the cut by a narrow profile. The high-speed cutter presumably leaves the prepreg web to be cut on the underside and enters a longitudinal slot in the supporting profile. To compensate for a changed basis weight of the prepreg web, the rectangular dimension of the blanks in the longitudinal direction of the prepreg web is used. For monitoring the target weight to be maintained of the prepreg stack, it is not the cut-off blanks that are weighed but the finished SMC component. Depending on the deviation of the finished weight of the SMC component from a desired weight, the blanks are cut longer, shorter or the same for the next SMC component to be produced. A fundamental disadvantage of the control strategy known from [1] for maintaining the desired weight of the raw mass to be introduced is that a control intervention for correcting the actual controlled variable—raw mass for the component n—is made dependent on the desired/actual deviation of a variable other than the measured variable—that is the finished component mass of the component n+1. The measured variable "finished component mass of the component n+1" does not by any means have to be representative of the actual controlled variable "raw mass for the component n". The method described in [1] attempts to record or predict possible differences between the controlled variable and the measured variable by continuously recording the thickness of the prepreg web. Because of the differences between the measured variable on the one hand and the controlled variable on the other hand, a high proportion of the SMC components manufactured according to deviate from the desired weight aimed for; the control strategy known from [1] only works on the basis of such a deviation. Apart from this, in the method according to [1] the blanks have to be rectangular, with a width corresponding to the width of the prepreg web. However, this prerequisite can only be allowed optimally in terms of the method for a restricted spectrum of components.

In conventional methods for manufacturing series of SMC components, often performed manually, the mass of prepregs introduced into the mold is individually weighed, which likewise takes place manually and constitutes a great obstacle to automation of the process. This usually involves cutting out rectangular blanks with a sharp knife from a virtually endless prepreg web on a steel base and weighing them. If the desired weight of a blank to be introduced into a prepreg stack is too great, an edge strip is cut off on one longitudinal side of a blank or a triangular piece is cut off at a corner, whereby the desired weight is achieved approximately but not exactly. In particular, however, the desired shape of the blank is greatly changed by such a correction, which has disadvantageous effects on the molding process and the component quality. If, on the other hand, the desired weight of a blank is too low, the next-following blank is cut somewhat larger than the desired shape or a small trimmed-off part of an earlier corrective operation is added. These types of correction have disadvantageous effects on the subsequent molding operation and the component quality. Moreover, this manual weighing of the amount of raw material means that the desired weight is only approximated with a very great range of variation, which is scarcely any less than the weight variation of the prepregs themselves. For this reason, in the production of SMC components with manual weighing of the raw material there are a relatively high number of reject components and relatively considerable quality variations.

EP 461 365 B1—cited hereafter as [2] for short—discloses a method for manufacturing plastic moldings from thermoplastic material in which an amount of heated and softened thermoplastic material appropriately adapted in weight is placed into an opened mold of a press, the molding compound is forced to flow into the cavity of the mold by closing the mold and subsequently the workpiece still located in the mold is cooled and finally removed from it. The special feature of the method described in [2] is the preparation of the heated thermoplastic material in a flat preform already appropriately adapted approximately to the shape of the cavity of the mold, with the distribution of the compression molding compound within the preform also already having been approximately adapted to the requirements of the cavity of the mold. For this purpose, a thin, wide strand of extrudate of hot molding compound is deposited on the heated and reversibly drivable conveyor belt of a belt weigher and at the same time weighed. The strand of extrudate is deposited on the conveyor belt in a meandering manner and with a variable mass distribution on account of a slow oscillating motion of the conveyor belt in the conveying direction or counter to it and on account of a specific belt speed, which may deviate from the extrusion speed. Also in the case of this method for the compression molding of thermoplastic material, the molding compound to be introduced into the cavity of the mold is to correspond exactly to a desired weight, in order on the one hand to ensure complete filling of the cavity and on the other hand to permit complete closing of the mold without excessive formation of flash. In the case of the method shown in [2], this is achieved by the strand of extrudate deposited on the belt weigher being continuously weighed. When, toward the end of the formation of a preform, part of the strand of extrudate is still hanging from the extruder die and not the entire molding compound intended for the preform is exerting its weight on the weigher, the extruded strand is cut off just before the desired weight is reached, i.e. when a certain weight threshold is reached. If the weight of the preform that is then completely on the belt weigher lies within a predetermined tolerance range, it is passed on to a downstream conveying devices, which deposit the preform into the opened mold. If, on the other hand, the formed preform is too heavy or too light, it is rejected and its molding compound is recycled. The weight threshold for triggering the severing of the strand for the next-following preform is also correspondingly corrected, i.e. in the case of an excessively heavy preform the weight threshold is changed in the direction of a lower threshold weight, and vice versa. However, this type of control of the weight of the molding compound to be introduced into a mold cannot be transferred to the processing of fiber-reinforced thermosetting materials, i.e. it cannot be transferred to the portioning of prepreg blanks.

Japanese laid-open patent application JP 10 044 153 A, cited hereafter as [3] for short, discloses a method for preparing prepreg blanks for the manufacture of SMC components. This involves processing individual pieces of material web of a length adequate for forming a number of rectangular blanks and of a width which coincides with the width of the blanks. At the beginning of the processing of a material web, a first rectangular blank of a known length is cut off, this first blank is weighed and this is used to determine the weight per unit length of the material web. On the basis of this weight per unit length, assumed to be sufficiently constant within the piece of material web to be processed at the time, a length of blank is mathematically fixed for the blanks subsequently to be cut off with the same surface area from the material web, with which length the blanks have a weight which coincides approximately from one to the another and also corresponds with sufficient accuracy to the weight required for the workpiece to be produced. Subsequently, the other pieces of material web are transversely cut in a way corresponding to this fixed specification into pieces of the same length and the blanks prepared in this way are processed one after the other in an SMC molding press for workpieces. A disadvantage of this procedure is that it is only possible in this way to process relatively short pieces of material web, for which the basis weight or the weight per unit length can be regarded as constant with sufficient accuracy over the entire length of the piece of web.

SUMMARY OF THE INVENTION

An object of the invention is to provide a method of producing SMC components wherein, in spite of a varying basis weight of the prepreg web, the desired weight prescribed for the prepregs can be maintained with high accuracy for every production cycle of an SMC component, without significantly changing the shape of the individual blanks.

This and other objects and advantages are achieved according to the invention in the following embodiments.

In an embodiment, in every working cycle a reference blank with constant shape and size is cut to size and separately weighed each time. The weight and size of the reference blank and the aimed-for total weight of the prepreg stack are used to determine mathematically the surface-area size of corrective parts which are cut to obtain the desired weight of the resin mass to be introduced. This is based on the assumption that the basis weight of the prepreg web changes only by a negligible amount in the direct vicinity of the location at which the reference blank has been cut out from the prepreg web. In such an embodiment, which is based on a resin mass comprising a stack of multiple layers, the further prepreg layers are regarded as corrective parts and the size to be maintained by all of them is determined. These other blanks are then cut out from a region of the respective prepreg stack lying directly adjacent to the reference blank in the prepreg web and formed into a stack.

In another embodiment wherein the prepreg is to be introduced as a single layer, a reference part is cut out with excess size and weighed, and the excess in terms of weight is then cut off in a corresponding surface area.

Other objects, advantages and novel features of the present invention will become apparent from the following detailed description of the invention when considered in conjunction with the accompanying drawings.

DETAILED DESCRIPTION OF THE PREFERRED EMODIMENT

Figure 1:
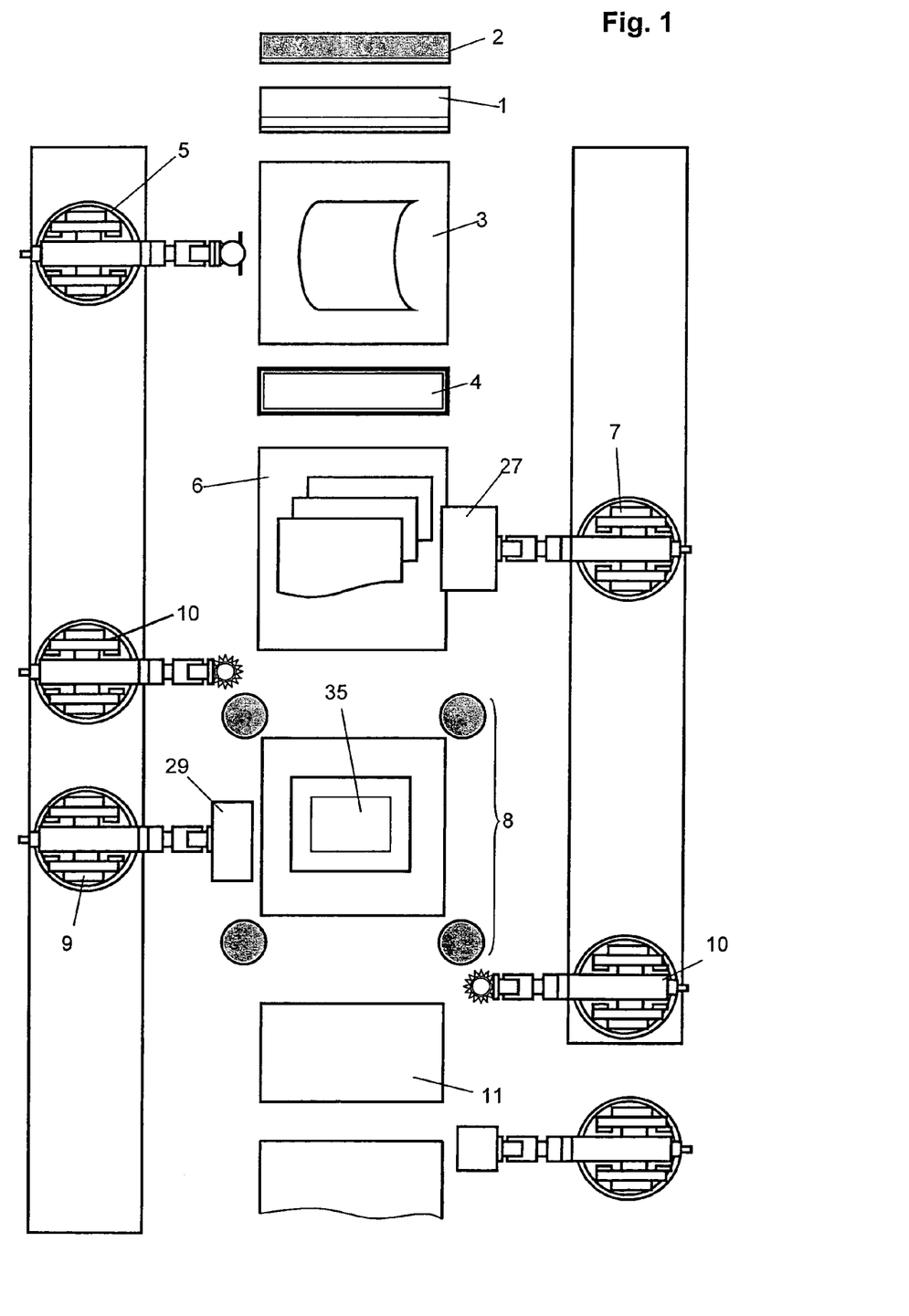
FIG. 1 shows a schematic overall view of an installation for the method in a plan view.
Figure 2:
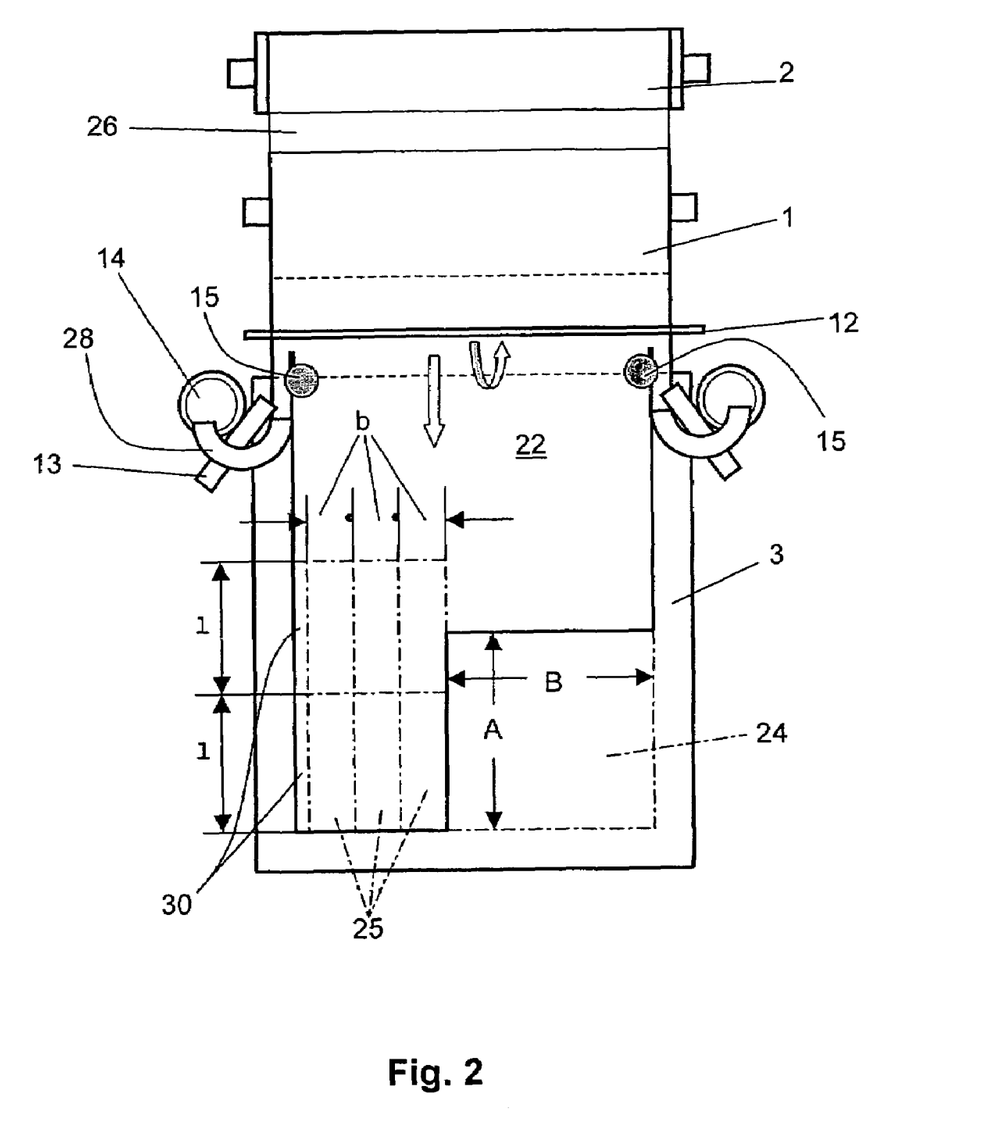
FIG. 2 shows the cutting table with the outline on a prepreg web for the cutting to size of the parts of a seven-part prepreg stack of a first exemplary embodiment.

The method on which the invention is based for manufacturing series of SMC components is to be briefly explained on the basis of the diagram of the method according to FIGS. 1 and 2. The SMC components are manufactured from a fibrous, reactive resin mass, which is provided in the form of a virtually endless prepreg web 22 wound up into a supply roll 1 as an intermediate. The fibers contained in the prepreg web are generally glass fibers; in the case of heavy-duty SMC components, carbon fibers or Kevlar fibers may also be integrated. The fibers are cut and have a length of approximately 1 to 5 cm. To maintain the reactivity of the synthetic resin in the prepreg web 22, the latter is covered on both sides with a protective film 26, which is pulled off and rolled up to form a separate roll 2 only shortly before the processing of the prepreg. As can be seen more clearly in FIG. 2, the protective film is deflected counter to the processing direction of the prepreg to the roll 2 via a reversing rod 12, located in the vicinity of the cutting table 3. The side edges of the prepreg web are unsuitable for further processing and must be cut off. The lateral waste strips 28 are likewise deflected via reversing rods 13 into waste containers 14.

Alternatively, when the cutting tool described further below is used, it is also possible for the prepreg webs provided with an adhesively attached protective film to be cut. For example, the edge strips 28 (FIG. 2) can be cut off before the protective film 26 is pulled off. In some embodiments, it may be desired to cut the blanks to size with the protective film, to allow them to be stacked up before further processing and only processed further at a later point in time. The protective film adhering to each of the blanks readily prevents the blanks that are stacked or deposited in an imbricated formation from sticking together. Conventionally separate sheets of film were required as an intermediate layer, causing extra costs.

The following description is based on an embodiment, in which the protective film is pulled off and wound up as one before the cutting of the prepreg web. This embodiment has the advantage that it can be checked more easily whether the protective film has detached itself completely from the prepreg web. Remains of film adhering to the blanks are detrimental to the further processing process and to the strength of the molding to be manufactured.

In one embodiment, the prepreg web 22 is cut up on the cutting table 3 provided with a very hard support. Blanks of a defined shape and size are cut out from the prepreg and stacked up to form a multi-layer prepreg stack web of a specific number of layers and arrangement of layers. The trimmed-off parts produced thereby, which cannot be used any further, are removed into a corresponding waste container 4. The cutting to size may in principle be performed manually with a sharp knife and a steel rule. In the case of the exemplary embodiment represented in the figures, however, a mechanized and automated cutting to size by means of a cutting robot 5 is provided. This embodiment is discussed in more detail below.

Figure 3:
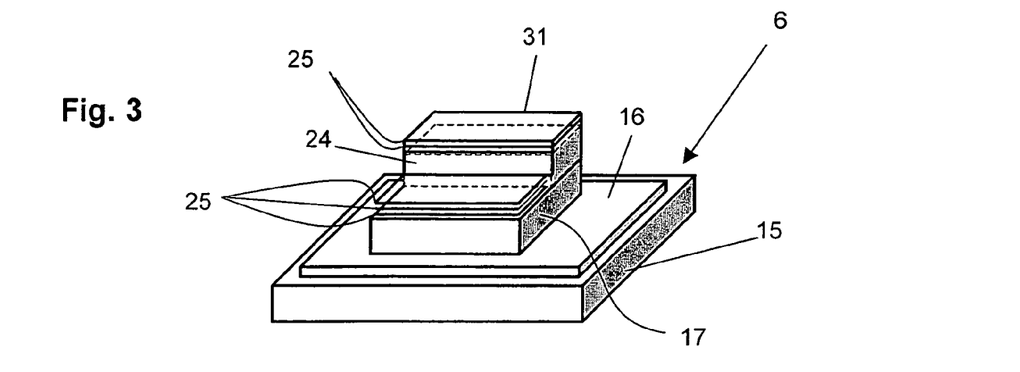
FIG. 3 shows an auxiliary device set up on a weigher for weighing the reference blank and for preparing a prepreg stack obtained according to FIG. 2.

On a separate weighing and stack-forming device 6—see also FIG. 3—the blanks cut by the robot 5 on the table 3 are stacked up to form a prepreg stack 31, the blanks being handled and moved by a handling robot 7, which for its part is equipped with a prepreg gripper 27 designed specifically for this task and this substrate. Once the prepreg stack 31 has been formed in an appropriate shape for a new workpiece, it is placed by the handling robot in a defined position into a heated mold 35 of the molding press 8.

The mold is closed by the press until the molding surface of the cavity is in contact with the placed-in prepreg stack and is clamped in the closing sense by a defined, initially small force. The contact with the hot mold causes the resin mass to be heated and softened as a result. On account of the closing force of the mold 35, the resin mass begins to flow and, as a result, fills the cavity of the increasingly closing mold. The mold is subsequently held in the closed state with an increased force for a certain time, the resin mass thermally curing. Once this curing time has elapsed, the press 8 opens the mold, with the finished SMC component remaining in the lower, fixed mold half. The SMC component can be removed from the press and deposited in a cooling station 11 by a removal robot 9, which is provided with a removal tool 29. While the cutting and handling robots 5 and 7 prepare a new prepreg stack, the opened mold is cleaned by two cleaning robots 10, so that it is ready for receiving a new prepreg stack.

The described method for producing the SMC components requires that the resin mass introduced into the mold coincides with a specific desired weight. The cavity of the mold should be completely filled by the resin mass introduced, but on the other hand there should not be too much resin mass in the cavity, because otherwise the mold cannot close completely and the formed SMC component is not molded to the true dimensions. Furthermore, an unnecessarily large amount of resin mass swells out at the parting line of the mold, which makes the cleaning operation more difficult. Unfortunately, the prepreg web 22 has inadmissibly high variations in the basis weight, which cannot be avoided in the manufacture of this intermediate. Consequently, to achieve the prescribed desired weight, it is not possible to use blanks of a constant surface area from one working cycle to the next. Rather, special efforts have to be undertaken to achieve the target weight of the resin mass to be introduced in each working cycle.

To be able to maintain with great accuracy the desired weight prescribed for the prepreg stack to be introduced for each production cycle of an SMC component, without significantly changing the shape of the individual blanks, the present invention provides a method for cutting the blanks of the prepregs to size. This is based on the largely correct assumption that the basis weight of the prepreg web changes only by a negligible amount within a surface-area region required for the amount of resin mass needed for an SMC component.

On the basis of this finding, the blanks 24, 25 to be used for the prepreg stack 31 of a specific SMC component are not only cut out from one and the same prepreg web 22, but also cut out from it directly adjacent to one another. Furthermore, a special blank, a reference blank 24, with a shape that is always constant and the same surface-area content Fr for all the prepreg stacks following one another is cut to size and separately weighed each time after the cutting to size, and its actual weight $G_{r,actual}$ is determined. As a result, the local, actual basis weight of the prepreg web is to a certain extent known. Apart from comprising the reference blank 24 of a constant surface area, the required prepreg stack comprises further blanks 25 formed with variable surface areas. These can be specifically dimensioned in their surface area in such a way that the total weight of the prepreg stack can be trimmed exactly and in a single operation to the desired weight that is to be maintained.

The respective weight $G_{r,actual}$ and the surface-area content $F_r$ of the reference blank 24 as well as the predetermined total weight $G_g$ of all the blanks 24, 25, that is always the same for all the prepreg stacks 31 following one another, are used to determine the surface-area content $F_u$ to be maintained by all the other blanks 25 which individually correspond to the weighed reference blank 24, in accordance with the relationship $$F_u = F_r \cdot (G_g/G_{r,actual} - 1)$$

or in accordance with a relationship which is derived therefrom and identical in principle. With the knowledge of the magnitude of the surface-area content $F_u$ of the other required blanks 25, the latter can be cut out from the prepreg web in an exactly specific manner with respect to their weight together. These blanks are cut out from a piece of the surface area lying directly adjacent to the reference blank 24 in the prepreg web 22, appropriately adapted in shape and size and with the surface-area content $F_u$. The prepreg stack 31 assembled with the weighed reference blank 24, of a constant surface area, and with the other blanks 25, dimensioned individually in surface-area content, has a total weight $G_g$ that coincides with the desired weight to within a few tenths of a percent. In a laboratory trial carried out by the applicant for the invention, it was possible to maintain the predetermined desired weight of the prepreg stack to within a range of variation of ±0.3%. The prepreg stack of constant weight formed in this way can consequently be readily placed in a defined position into the mold 35 ready to receive it of the molding press 8 for further processing.

The continuous weighings of reference blanks of the same surface area, carried out when the method according to the invention is performed in a series mode, incidentally also provide a reliable volume of data with respect to the variation in the basis weight of the prepreg web in the longitudinal direction of the web. The very dense set of data generated can be evaluated in various respects. For example, the basis weight of the prepreg web in the longitudinal direction of the web can be printed out as a longitudinal profile, i.e. as a line trace; the mean basis weight, the standard deviation and the maximum deviation from the mean value can be determined. These data allow reliable quality control or quality monitoring of the prepreg webs delivered.

As already mentioned, for each workpiece the total weight $G_g$ of the prepregs is entered as a desired value into a mathematical operation which is then used for cutting the prepreg parts to size exactly and individually for each workpiece. The invention readily allows this desired value to be slightly changed if appropriate or to be adapted to new findings or circumstances. The desired weight can be corrected in the course of series production from a value X to a value of, for example, X+0.5% or, for example, to a value X−1.3%. With the input of the new desired weight, the actual total weights of the prepreg stacks manufactured after the change are then also correspondingly higher or lower, to be precise likewise with the accuracy mentioned of ±0.3%. The invention therefore allows sensitive and exact selection of the total weight of the prepregs that are to be placed into the mold 35.

Once the prepreg stacks have been assembled on a weigher, it is readily possible also to determine exactly the actual total weight of the finished prepreg stack by weighing, and to fix it for each workpiece. This not only allows monitoring of the method according to the invention of weighing the prepreg webs. The actual weights of the finished prepreg stacks that are fixed individually for each workpiece also provide important data for quality monitoring of the production of moldings.

Based on the admissible assumption made that the gradient of the basis weight within the prepreg web 22 is small, it follows that the basis weight is constant with sufficient accuracy within the amount of surface area needed for a prepreg stack. This in turn leads to the recommendation to cut out the reference blank 24 and the other blanks 25 of each prepreg stack next to one another from the prepreg web, transversely to the longitudinal direction of the prepreg web, in such a way that the space required in the longitudinal direction of the prepreg web is as small as possible.

In the case of a prepreg stack in which the other blanks 25 are formed such that they are rectangular and also congruent, as provided for example in the case of the exemplary embodiment represented in FIGS. 2 and 3, one dimension l of the side of the rectangle of the other blanks 25 is left unchanged for all the prepreg stacks 31 following one another. Only the dimension b transverse thereto of the side of the rectangle of the other blanks 25 is dimensioned individually for the prepreg stack in question according to the technical teaching of the present invention. In the case of the exemplary embodiment represented in FIG. 2, with six other blanks 25, the unchanged longitudinal dimension l of the side of the rectangle of the other blanks is aligned parallel to the longitudinal direction of the prepreg web 22. The individually dimensioned width dimension b of the side of the rectangle of the other blanks is aligned transversely to the longitudinal direction of the prepreg web 22. In the simplified case described here, the width b of the other blanks 25 can be individually fixed in accordance with the relationship $b = F_r \cdot (G_g/G_{r,actual} - 1)/l \cdot n$, where n denotes the number of other blanks 25. Once the actual weight of the reference blank 24 has been determined on the weigher 15, this value is automatically entered in digitized form into the control system or the movement program of the cutting robot 5, which then cuts out the other blanks 25 with the individual width b from the prepreg web 22 on the basis of this input.

The space requirement evident from FIG. 2 for the seven blanks 24 and 25 shown there cannot be evenly distributed over the width of the prepreg web 22. In the region of the reference blank 24, only material of the dimension A is used up in the longitudinal direction of the web, whereas on the opposite side of the web material of the significantly greater dimension 2·l is used up. To compensate for this, it is expedient to change over the sides on which the reference blank 24 and the other blanks 25 are arranged for the next-following cutting-to-size operation, so that the prepreg is used up evenly on the right and left. However, this has to be correspondingly taken into consideration in the programming of the sequence of movements of the cutting robot 5.

The usable width of the prepreg web 22 is at least slightly greater than the width B of the reference blank 24 plus three times the greatest width b of the other blanks 25. As a result, an edge strip 30 is generally obtained at one edge of the prepreg web as cutting loss and is discharged into the waste container 4. Only in the extreme case of an extremely low basis weight of the prepreg web may this edge strip loss be negligible.

For the sake of completeness, another possibility should also be pointed out, that of trimming the weight of the prepreg stack to the desired weight value in a single operation by suitable surface-area dimensioning of the other blanks. The possibilities mentioned below largely depend on the type and shape of the SMC component to be manufactured and the related question as to the extent to which the form of the prepreg stack may vary from workpiece to workpiece. To be precise, it is conceivable to cut out from the prepreg web a certain number, for example four, of the other blanks 25 for each prepreg stack likewise with the same surface area, i.e. with a constant length and with an always constant width, and merely to dimension the remaining number, in the example two, of the other blanks 25 individually in width. These two individually dimensioned blanks 25 would of course vary much more in their width dimension b than if the weight compensation were evenly distributed over six blanks 25. In the extreme case, it would even be possible to use only one of the other blanks for such a weight compensation, which in the case of a two-layer prepreg stack would in any case be unavoidable.

In the case of the exemplary embodiment represented in FIGS. 2 and 3, the prepreg stack to be formed altogether comprises seven blanks, that is a particularly large reference blank 24 and six much smaller other blanks 25, which are stacked up in two small stacks lying next to each other on the reference blank 24 lying at the bottom. Irrespective of the arrangement of the reference blank in the prepreg stack to be formed, however, a blank that is as large as possible should be selected to form the reference, so that the weight determined is also reliably representative of the basis weight of the prepreg web in the region of the web end that is being worked on at the time. The reference blank should expediently have a size of approximately 20 to 60% of the total surface area of all the blanks of the prepreg stack 31. If it is too small, the weight and the surface area do not represent the local basis weight with sufficient accuracy. If, on the other hand, the reference blank is too large, it may be that the weight compensation is not successful in every case with the relatively small other blank or blanks without trimming them excessively in the extreme case of a very high basis weight. In such a case, it is then better to take away at least part of the excess prepreg weight from the reference blank itself. This is to be discussed once again further below in connection with a further exemplary embodiment according to FIG. 6.

In the procedure of the method it is favorable if the blank lying at the bottom in the prepreg stack 31 is adequate in size to allow it to be selected as the reference blank 24. After weighing the reference blank, no further handling operations are then necessary with it, i.e. the other blanks 25 can be stacked on the reference blank still lying on the weighing plate 16 of the weigher 15 to form the prepreg stack 31. With blanks that are substantially congruent, the lowermost blank is therefore chosen as the reference blank and is cut to always the same size of surface area. In the case of stacks with, for example, five identical prepregs, this would be approximately 20% of the total weight. In the case of six or more prepregs in a stack, the two lowermost prepregs, for example, can both be chosen to be the reference blank, cut to always the same size of surface area and weighed together.

In the case of the exemplary embodiment represented in FIG. 3, the reference blank 24 is not only weighed when it is placed onto the weigher 15, but at the same time also preformed in a specific way, as expedient later for placing the finished prepreg stack 31 into the mold. For this purpose, fastened on the weighing plate 16 of the weigher is a stacking device 17, which permits staged pre-forming of the reference blank by the handling robot and the prepreg gripper. The other blanks 25 are stacked up on the lower or upper portion of the reference blank deposited in stages.

In principle, the invention can also be put into practice in a manually operated procedure for the method, in which for example the cutting out of the blanks is also performed by means of a hand-held knife and steel rule on a steel base and in which the blanks are manually handled by the worker. This manner of working is also occasionally still encountered today in the series production of SMC components. The reference blank 24 could be cut relatively precisely by using a template. Templates of different shapes could also be used for the other blanks 25, it being automatically output after the weighing of the reference blank which template from a finely graduated set is to be used. Cutting to size by using punching tools, as are used for the cutting to size of leather in a flat press, is also conceivable, if appropriate with the assistance of vibrators. For cutting the other blanks to size with flexibility in their surface area, a set of finely graduated punching tools would then have to be kept available. Depending on the computed result, an individually specified punching tool from the set would have to be issued and placed onto the prepreg web for punching out a blank.

However, in spite of all the care taken, manual cutting to size of the prepregs entails the risk of a greater surface-area tolerance and consequently weight tolerance. Quite apart from this, this strenuous work in the direct proximity of noxious fumes from the prepreg webs is only admissible for any time with a protective mask and is therefore even more strenuous or laborious. To avoid such manually caused inaccuracies and the strenuous work, it is recommended to cut out both the reference blank 24 and the mathematically determined cut-to-size areas of the blanks 25 by means of a robot-guided cutting tool.

Under some circumstances, a sharp cutter with an exchangeable blade could be used as such a robot-guided cutting tool—in a way similar to in the case of manual cutting to size—said cutter being moved through the prepreg with a drawing cut, i.e. at a shallow angle, although it would be necessary to monitor that no fiber strands attach themselves to the cutting edge and disturb a clean cut. Because of this problem, a high-frequency rotary oscillating circular saw blade 21, which performs small rotational displacements around a stationary central position, is recommended in the present case as the cutting tool for the automated cutting to size of the blanks by means of cutting robot 5. During the cutting to size, the prepreg web 22 is supported by a smooth, continuous base that is free from joints, in the form of a thick glass plate 23, which is harder than the cutting teeth of the circular saw blade.

Figure 4:
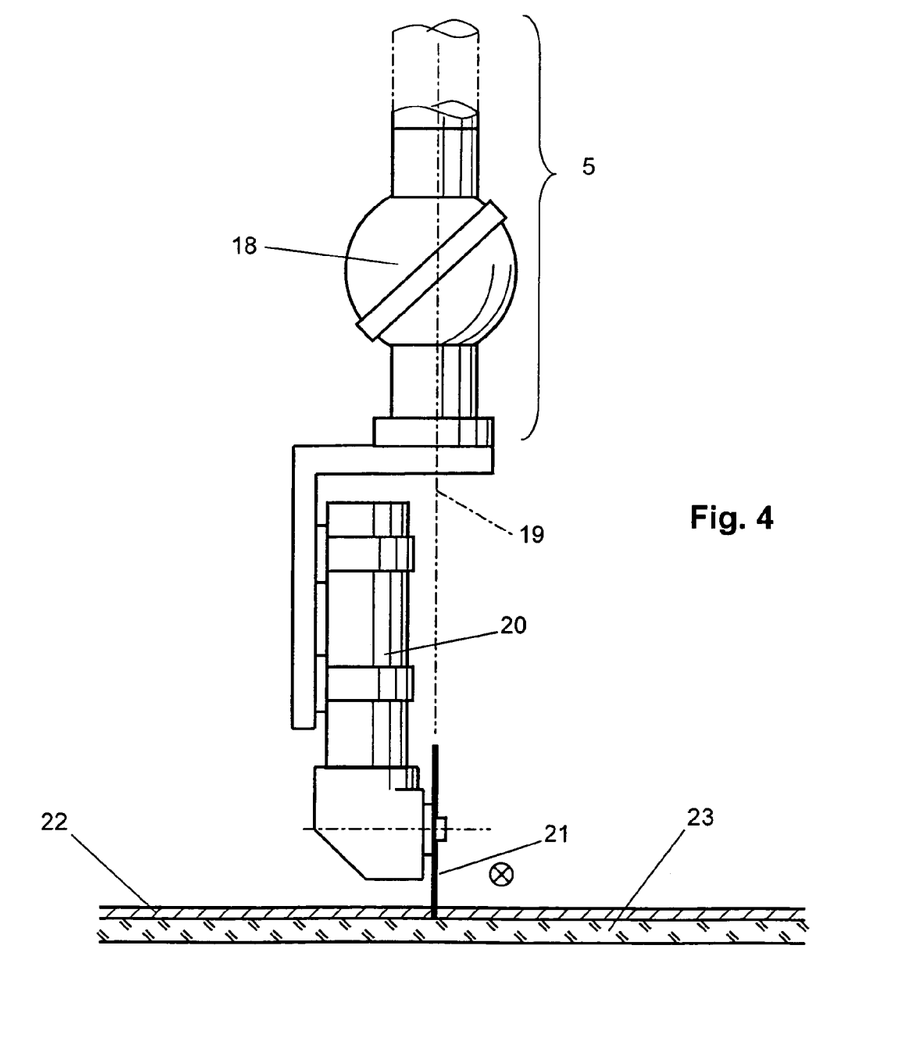
FIG. 4 shows the cutting tool arranged on the hand joint of an industrial robot, with a circular saw blade, which perform high-frequency rotary oscillating movements, for cutting up the prepreg web supported by a glass plate.
Figure 5:
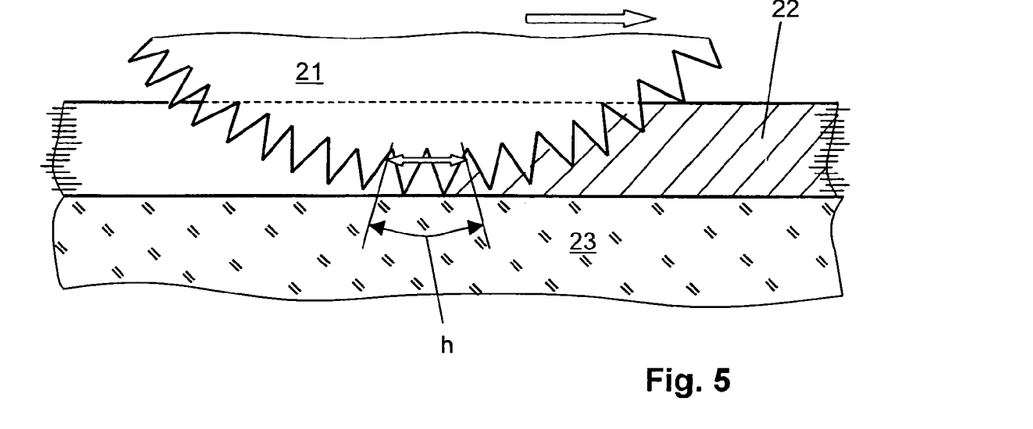
FIG. 5 shows an enlarged detail of the cutting intervention of the circular saw blade into the supported prepreg web and FIG. 6 shows the cutting to size of a single-layer useful blank of a predetermined weight from a reference blank of varying basis weight as a second exemplary embodiment.

At the hand joint 18 of the cutting robot 5, a drive motor 20 for the circular saw blade 21 is secured by means of a holding angle in such a position that the hand joint axis 19 crosses the axis of the rotary oscillating movement of the circular saw blade. The drive motor sets the circular saw blade in rotary oscillations with approximately 20,000 rotational displacements per minute via an integrated displacement gear mechanism. The cutting tool is guided along the desired cutting line in such a way that the circumference of the circular saw blade touches the glass plate 23 with a small force during the cutting. The quite small rotary oscillating displacements h performed by the circular saw blade are indeed greater than the tooth pitch t, but smaller or slightly greater than the thickness s of the prepreg web 22. The rotary oscillating circular saw blade acts in a way similar to a compass saw, but with two fundamental differences. On the one hand, the sawing tool has a displacement along a circular path which tangentially enters the material being cut and does not leave the material being cut on the underside; the cutting displacements in the form of circular arcs are oriented at a very shallow angle with respect to the plane of the prepreg. On the other hand, even in the loosely lying state, the material being cut cannot follow the high-frequency oscillating movement because of inertia, so that the prepreg resting loosely on the glass plate can be cut through without any trouble. The advantage of this cutting tool is not only trouble-free and low-wear working when cutting prepregs to size, but also the possibility of being able to carry out cuts along tight curves with precision.

Figure 6:
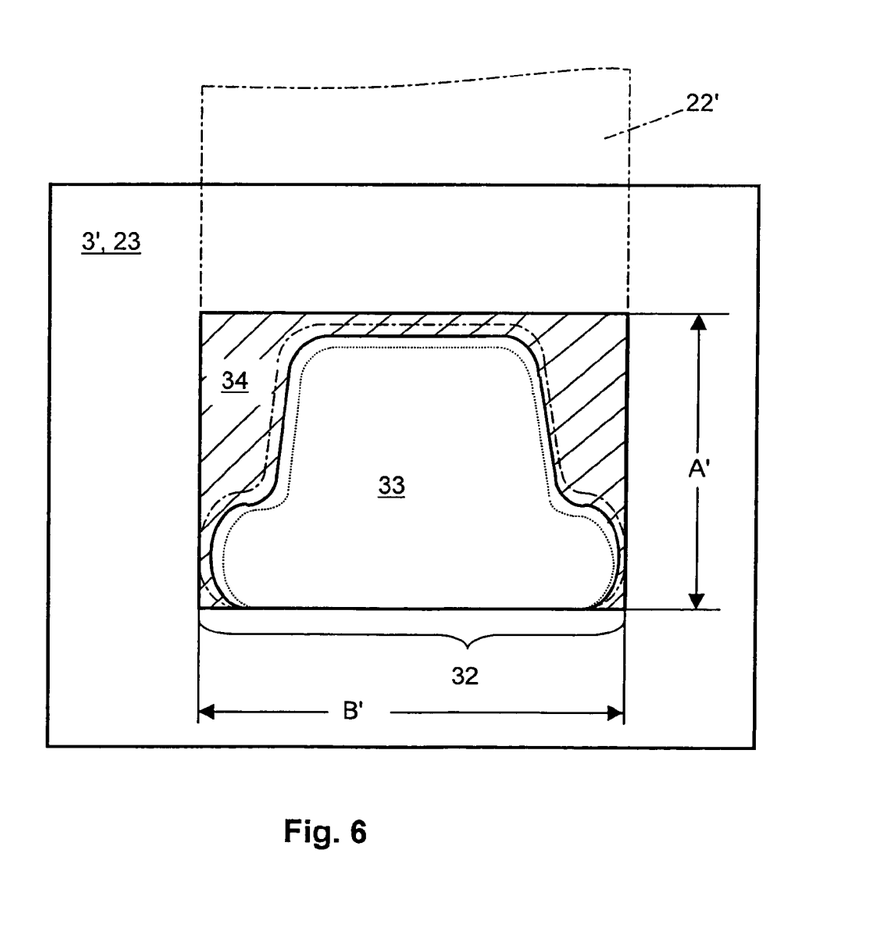

Also to be briefly discussed below in connection with the exemplary embodiment represented in FIG. 6 is a variant of the method for the series production of SMC components in which an in principle single-layer useful blank 33 of a prepreg 22' is used and it is placed in a defined position into the heated mold of a molding press. The further sequence of the method for the manufacture of SMC components is the same in principle here as already described further above. Even if in the actual case a smaller blank or else a number of them should be placed onto the useful blank 33 locally and in a defined position, this case is also intended to be implied in the description and recommendation which follows, although this additional, smaller blank is not specifically mentioned below.

Even when useful blanks that in principle comprise a single layer and are of constant weight $G_n$ are used, at first a reference blank 32 is cut to size with a shape and surface content Fr that is always the same for all the SMC components following one another and separately weighed each time after cutting to size, the actual weight $G_{r,actual}$ in each respective case being determined. The shape and surface-area content $F_r$ of this reference blank are chosen such that the latter protrudes beyond the useful blank on all sides in every case. Even assuming an extremely low basis weight of the prepreg web 22', the reference blank is large enough to allow the useful blank 33 to be cut out from it with the prescribed weight $G_n$ of the useful blank 33. In any event, a more or less large waste piece 34 is obtained when cutting back the reference blank, i.e. when cutting to size the useful blank 33 from it.

In the case of the exemplary embodiment represented in FIG. 6, a rectangular shape with the side lengths A' and B' is chosen for the reference blank 32, the width dimension B' corresponding to the usable width of the prepreg web 22'. The reference blank can then be cut to size by a straight cut taken transversely to the longitudinal direction of the prepreg web at the distance A' from the previous end edge. It just has to be ensured that the surface-area content $F_r$ of all the reference blanks are the same as one another with an error deviation of very few tenths of a percent. The cutting table 3' used for cutting the reference blank 32 is at the same time formed as a weigher, i.e. the glass plate 23 forming the table top is at the same time the weighing plate of a weigher. For weighing the cut-free reference blank, the end of the prepreg web 22' must be temporarily lifted off the cutting table 3' by the handling robot 7 or by another, more simple auxiliary device. Alternatively, it is also possible to restrict the weighing plate only to a partial region of the cutting table and, for weighing only the reference blank, to lower the weigher to such an extent that the end of the prepreg web is no longer touching the weighing plate, because it is held by the surrounding table top.

The respective weight $G_{r,actual}$ and the surface-area content $F_r$ of the reference blank 32 and also the predetermined weight $G_n$ of the useful blank 33 are used for determining the surface-area content $F_a$ of the excess in terms of surface area of the reference blank 32 in comparison with the surface-area content $F_n$ of the useful blank 33, i.e. the size in terms of surface area of the waste piece 34. For this, the relationship $F_a = F_r \cdot (1 - G_n/G_{r,actual})$, or a relationship which is derived therefrom and identical in principle, is used.

Once there is knowledge of the surface-area content $F_a$ of the waste piece 34, this item of data can be automatically entered in a suitable, for example digitized, form for each workpiece into the control system of the cutting robot 5. Stored in the robot control system is a finely graduated set of movement lines for guiding a curved cut, each individual movement line being assigned a specific surface area $F_a$. Three of these cutting lines are indicated in FIG. 6. In accordance with the output of a specific $F_a$ value, the associated movement program is activated in the control system of the cutting robot and the cutting robot is moved in accordance with it. The hatched region lying outside the actual cutting line represents the waste piece 34 to be removed. If the reference blank is very heavy, a waste piece 34 with a large surface-area content $F_a$ is cut off, in the case of a light reference blank the converse case applies. In any case, the waste pieces to be cut off are similar in their shape and in any event a piece of surface area coinciding in shape and size with the desired useful blank 33 with the weight $G_n$ remains and can be placed into the mold.

In an embodiment of the method according to FIG. 6 that, if it has been cut to size by using an industrial robot, the reference blank is no longer moved after the cutting to size, i.e. the reference blank should not, for weighing purposes, be taken off the base on which it was cut or be moved, because otherwise the reference to the system of the cutting robot is lost. This is also the reason why the cutting table is formed at the same time as a weigher or as a weighing plate.

It may happen under some circumstances that, because of a local thickening on a workpiece, a smaller blank also has to be placed locally onto the useful blank. This additional blank would be ignored in the method previously described in connection with FIG. 6 for the weight correction of the resin mass to be introduced by cutting back the reference part 32 specifically in terms of its surface area. If this additional part were always cut to size with the same surface area, a certain error would be included in the predetermination of the total weight of an amount corresponding to its proportionate size. In order however to allow such a smaller blank also to be included in the predetermination of the total weight that is to be maintained, nevertheless only the weight of the bottom useful blank would have to be entered in the above relationship for determining the surface area $F_a$ of the waste piece, instead of the total weight of the stack to be placed into the mold. The size of the not-included further blank would have to be cut out from the waste piece, it being necessary for this blank to be cut to size with respect to its surface content in inverse proportion to the determined basis weight of the reference blank.

For the sake of completeness, a modification of the cutting method according to FIG. 6 should also be mentioned, a useful blank 33 of the same shape, trapezoidal in rough approximation, being assumed here. This modification of the process manages with a much smaller amount of trimmed-off waste. To be precise, on the one hand the useful blanks that are trapezoidal in rough approximation would have to be placed into the prepreg web in such a way that the two straight and mutually parallel side edges of the useful blanks come to lie parallel to the side edges of the prepreg web; the feed of the prepreg web would consequently have to be imagined from the left or right side in FIG. 6. Moreover, the width of the prepreg web would have to be chosen such that it coincides with the corresponding dimension of the largest required useful blank—which is represented in FIG. 6 by a dash-dotted line; it would also be conceivable to arrange two sequences of reference parts parallel next to one another on the prepreg web. On the other hand, the useful blanks following one another in the longitudinal direction of the web are cut out from the prepreg web alternately from one side then the other, so that the large dimension, parallel to the longitudinal direction of the web, of one useful blank always coincides with the small dimension of the next-following useful blank.

In the case of such a variant of the method, the reference blank that is to be used is a blank already cut to size in a way corresponding to the desired free form, which is dimensioned to be large enough to be just right with respect to its surface-area content in the case of the lowest basis weight of the prepreg web, i.e. the basis weight lying at the lower end of the range of variation, and has the required desired weight. By temporarily lifting the end of the prepreg web off the cutting table, which is at the same time the weighing plate, it is possible to determine the actual weight of this reference part, which is generally too high in comparison with the desired weight to be maintained. In a way similar to that already described in connection with FIG. 6, the excess weight of the reference part in question is converted into a new blank contour, three of which are indicated in FIG. 6 by differently drawn line traces. The reference part is specifically reduced in weight by a more or less wide edge trim similar to the outline shape of the reference part and, as a result, the desired weight of the useful blank 33 is exactly brought about. Apart from the form-dependent trim, only a relatively narrow, weight-dependent edge strip is then obtained as trimmed-off waste.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for manufacturing a plurality of SMC components comprising:
    cutting a reference blank having a reference blank shape, a reference blank size, and a reference blank surface-area content;
    obtaining a reference blank weight;
    determining either a proper surface-area content or an excess surface-area content of a single prepreg web used to produce a plurality of non-reference blanks using said reference blank surface area content, said reference blank weight, and a predetermined non-reference blank weight;
    removing a waste piece having said excess surface area from said single prepreg web;
    cutting said reference blank and said plurality of non-reference blanks from said single prepreg web, wherein the blanks are directly adjacent to one another in the prepreg web prior to cutting;
    stacking said reference blank and said plurality of non-reference blanks to form a multilayer prepreg stack;
    placing said multilayer prepreg stack into a heated mold of a molding press;
    flow molding the prepreg stack by at least partially closing the mold to form a SMC component;
    thermally curing said SMC component in said mold, wherein said mold is closed during curing;
    forming at least one additional SMC component from at least one additional multilayer prepreg stack, each said at least one additional multilayer prepreg stack including an additional reference blank having said reference blank shape and said reference blank surface-area content; and
    weighing each additional reference blank separately after cutting;
    wherein the excess surface-area content is mathematically determined in accordance with a relationship between the excess surface-area content, the reference blank surface-area content, the reference blank weight, and the predetermined non-reference blank weight; and
    wherein the non-reference blanks are cut from a portion of the prepreg web directly adjacent to the reference blank.

2. The method as claimed in claim 1, wherein the blanks for said multilayer prepreg stack and said one or more additional multilayer prepreg stacks are cut from said single prepreg web.

3. The method as claimed in claim 1, wherein the non-reference blanks in said multilayer prepreg stack are rectangular and congruent in relation to one another, wherein a dimension (l) of the side of the rectangle is the same for the non-reference blanks of said multilayer prepreg stack and for the non-reference blanks of said at least one additional multilayer prepreg stack, and wherein a dimension (b) transverse to the dimension (l) is dimensioned individually for the non-reference blanks in each multilayer prepreg stack in accordance with the relationship $b=F_r \cdot (G_g/G_{r,actual}-1)l \cdot n$, where n denotes the number of non-reference blanks.

4. The method as claimed in claim 3, wherein the dimension (l) is aligned parallel to the longitudinal direction of the prepreg web and the dimension (b) is aligned transversely to the longitudinal direction of the prepreg web.

5. The method as claimed in claim 1, wherein the surface area of the reference blank is approximately 20 to 60% of a total surface area of all blanks of the multilayer prepreg stack.

6. The method as claimed in claim 1, wherein the blank lying at the bottom of the multilayer prepreg stack is the reference blank.

7. The method as claimed in claim 1, wherein the reference blank and the non-reference blanks of the multilayer prepreg stack are cut out next to one another from the prepreg web, transversely to the longitudinal direction of the prepreg web, in such a way that the space required in the longitudinal direction of the prepreg web is as small as possible.

8. The method as claimed in claim 1, wherein said cutting is performed by a robot-guided cutting tool, and wherein the prepreg web rests on a hard base.

9. The method as claimed in claim 1, wherein said cutting is performed by a circular saw blade, said circular saw blade performing a rotary oscillating movement with more than 15,000 cycles per minute, and also having rotary oscillating displacements, wherein said displacements are greater than a tooth pitch of said circular saw blade.

10. The method as claimed in claim 9, wherein said circular saw blade performs a rotary oscillating movement having from about 20,000 to about 30,000 cycles per minute.

11. The method as claimed in claim 9, wherein said displacements are smaller than the thickness of the prepreg web.

12. The method as claimed in claim 9, wherein during the cutting by the rotary oscillating circular saw blade, the prepreg web is supported by a smooth, continuous base that is free from joints, wherein said base is composed of a harder material than the cutting teeth of the circular saw blade.

13. The method as claimed in claim 1, wherein the prepreg web is stripped of coverings or protective films prior to cutting.

14. The method as claimed in claim 1, wherein the relationship is:

$$F_a = F_r \cdot (1 - G_n/G_{r,actual}); \text{wherein}$$

$F_a$ is the excess surface-area content of the single prepreg web;

$F_r$ is the reference blank surface area content;

$G_n$ is the predetermined non-reference blank weight; and $G_{r,actual}$ is the reference blank weight.

15. The method as claimed in claim 1, wherein the relationship is:

$$F_u = F_r \cdot (G_g/G_{r,actual} - 1); \text{ wherein}$$

$F_u$ is a surface area content to be maintained by the non-reference blanks corresponding to the reference blank;

$F_r$ is the reference blank surface area content;

$G_g$ is the predetermined non-reference blank weight in total; and $G_{r,actual}$ is the reference blank weight.

* * * * *